(12) United States Patent
Xu et al.

(10) Patent No.: US 12,291,288 B2
(45) Date of Patent: May 6, 2025

(54) STEER-BY-WIRE SOFTWARE END STOP

(71) Applicant: STEERING SOLUTIONS IP HOLDING CORPORATION, Saginaw, MI (US)

(72) Inventors: Kaiser Xu, Suzhou (CN); Roger Liu, Suzhou (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 231 days.

(21) Appl. No.: 17/902,228

(22) Filed: Sep. 2, 2022

(65) Prior Publication Data
US 2024/0059345 A1 Feb. 22, 2024

(30) Foreign Application Priority Data
Aug. 22, 2022 (CN) .......................... 202211006485.6

(51) Int. Cl.
*B62D 5/00* (2006.01)
*B60W 50/10* (2012.01)

(52) U.S. Cl.
CPC ............. *B62D 5/001* (2013.01); *B60W 50/10* (2013.01); *B60W 2510/202* (2013.01)

(58) Field of Classification Search
CPC .... B62D 5/001; B62D 5/0481; B62D 5/0484; B62D 5/049; B62D 15/0205; B62D 15/02; B62D 15/00; B60W 50/10; B60W 2510/202; B60W 2710/207; B60W 2540/18; B60G 2800/962; B60G 2400/41; B60G 2400/40; B60Q 2300/122;
(Continued)

(56) References Cited

U.S. PATENT DOCUMENTS

| | | | | |
|---|---|---|---|---|
| 5,596,252 A | * | 1/1997 | Shimizu ............... | B62D 5/0463 318/432 |
| 2006/0025894 A1 | * | 2/2006 | O'Connor .............. | G01S 19/14 701/1 |

(Continued)

FOREIGN PATENT DOCUMENTS

| | | | |
|---|---|---|---|
| DE | 10102244 A1 * | 3/2002 | ............. B62D 5/006 |
| DE | 10221721 A1 | 11/2003 | |

(Continued)

*Primary Examiner* — Tiffany P Young
*Assistant Examiner* — Karen Lynelle Furgason
(74) *Attorney, Agent, or Firm* — Dickinson Wright PLLC

(57) ABSTRACT

A system for controlling an end-of-travel of a handwheel is disclosed. The system comprises: a processor; and a memory that includes instructions that, when executed by the processor, cause the processor to: receive sensor data from at least one sensor associated with a roadwheel actuator of a vehicle; determine, based on the sensor data, a mechanical end-of-travel value of the roadwheel actuator of a roadwheel actuator of the vehicle; determine, based on the mechanical end-of-travel value of the roadwheel actuator and a speed of the vehicle, a handwheel actuator end-of-travel active value and an end-of-travel damping value; determine an end-of-travel value of a handwheel actuator based on the handwheel actuator end-of-travel active value, the end-of-travel damping value, and a reference torque value; and selectively control the handwheel of the vehicle based on the end-of-travel value of the handwheel actuator.

14 Claims, 7 Drawing Sheets

(58) Field of Classification Search
CPC ............ B60Q 2300/10; B60Q 2300/00; B60L 2240/24; G05D 2111/58
USPC .......................................................... 701/41
See application file for complete search history.

(56) References Cited

U.S. PATENT DOCUMENTS

| | | | |
|---|---|---|---|
| 2006/0293818 A1* | 12/2006 | Lu ...................... | B62D 15/0235 |
| | | | 701/41 |
| 2017/0088173 A1* | 3/2017 | Kawabe ................... | B62D 1/00 |
| 2017/0240201 A1* | 8/2017 | Kim ........................ | B62D 6/10 |
| 2019/0367074 A1* | 12/2019 | Engels ................... | B62D 5/006 |
| 2021/0206424 A1* | 7/2021 | Nakakuki .......... | B62D 15/0215 |
| 2022/0204077 A1* | 6/2022 | Hsiao ................... | B62D 5/0463 |
| 2022/0234652 A1* | 7/2022 | Miranda .............. | B62D 5/0481 |

FOREIGN PATENT DOCUMENTS

| | | |
|---|---|---|
| DE | 102011015064 A1 | 12/2012 |
| DE | 102017202814 A1 | 8/2017 |

\* cited by examiner

STEER-BY-WIRE SOFTWARE END STOP

CROSS-REFERENCES TO RELATED APPLICATIONS

This patent application claims priority to Chinese Patent Application Serial No. 2022110064856, filed Aug. 22, 2022, which is incorporated herein by reference in its entirety.

TECHNICAL FIELD

This disclosure related to steering systems, and in particular to systems and methods for end stop learning and protection of handwheel actuators and roadwheel actuators in Steer-by-Wire (SbW) systems.

BACKGROUND

Vehicles, such as cars, trucks, sport utility vehicles, crossovers, mini-vans, marine craft, aircraft, all-terrain vehicles, recreational vehicles, or other suitable vehicles, include a steering system, such as an electronic power steering (EPS) system, a steer-by-wire steering system, a hydraulic steering system, or other suitable steering system. The steering system typically includes one or more controllers that control various aspects of the steering system including, but not limited to, controlling one or more electric motors and/or one or more actuators of the steering system. For example, in a SbW system, there are two actuators, a handwheel actuator and a roadwheel actuator.

SUMMARY

This disclosure relates generally to steering systems.

An aspect of the disclosed embodiments includes a system for controlling an end-of-travel of a handwheel. The system comprising: a processor; and a memory. The memory includes instructions that, when executed by the processor, cause the processor to: receive sensor data from at least one sensor associated with a roadwheel actuator of a vehicle; determine, based on the sensor data, a mechanical end-of-travel value of a roadwheel actuator of the vehicle; determine, based on the mechanical end-of-travel value of the roadwheel actuator and a speed of the vehicle, a handwheel actuator end-of-travel active value and an end-of-travel damping value; determine an end-of-travel value of a handwheel actuator based on the handwheel actuator end-of-travel active value, the end-of-travel damping value, and a reference torque value; and selectively control the handwheel of the vehicle based on the end-of-travel value of the handwheel actuator.

An aspect of the disclosed embodiments includes a method for controlling an end-of-travel of a handwheel. The method comprises: receiving sensor data from at least one sensor associated with a roadwheel actuator of a vehicle; determining, based on the sensor data, a mechanical end-of-travel value of a roadwheel actuator of the vehicle; determining, based on the mechanical end-of-travel value of the roadwheel actuator and a speed of the vehicle, a handwheel actuator end-of-travel active value and an end-of-travel damping value; determining an end-of-travel value of a handwheel actuator based on the handwheel actuator end-of-travel active value, the end-of-travel damping value, and a reference torque value; and selectively controlling the handwheel of the vehicle based on the end-of-travel value of the handwheel actuator.

An aspect of the disclosed embodiments includes a system for controlling an end-of-travel of a handwheel. The system comprises: the handwheel; at least one sensor associated with the roadwheel actuator of a vehicle; a processor; and a memory. The memory includes instructions that, when executed by the processor, cause the processor to: receive sensor data from the at least one sensor associated with the roadwheel actuator of a vehicle; determine, based on the sensor data, a mechanical end-of-travel value of a roadwheel actuator of the vehicle; determine, based on the mechanical end-of-travel value of the roadwheel actuator and a speed of the vehicle, a handwheel actuator end-of-travel active value and an end-of-travel damping value; determine an end-of-travel value of a handwheel actuator based on the handwheel actuator end-of-travel active value, the end-of-travel damping value, and a reference torque value; and selectively control the handwheel of the vehicle based on the end-of-travel value of the handwheel actuator.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
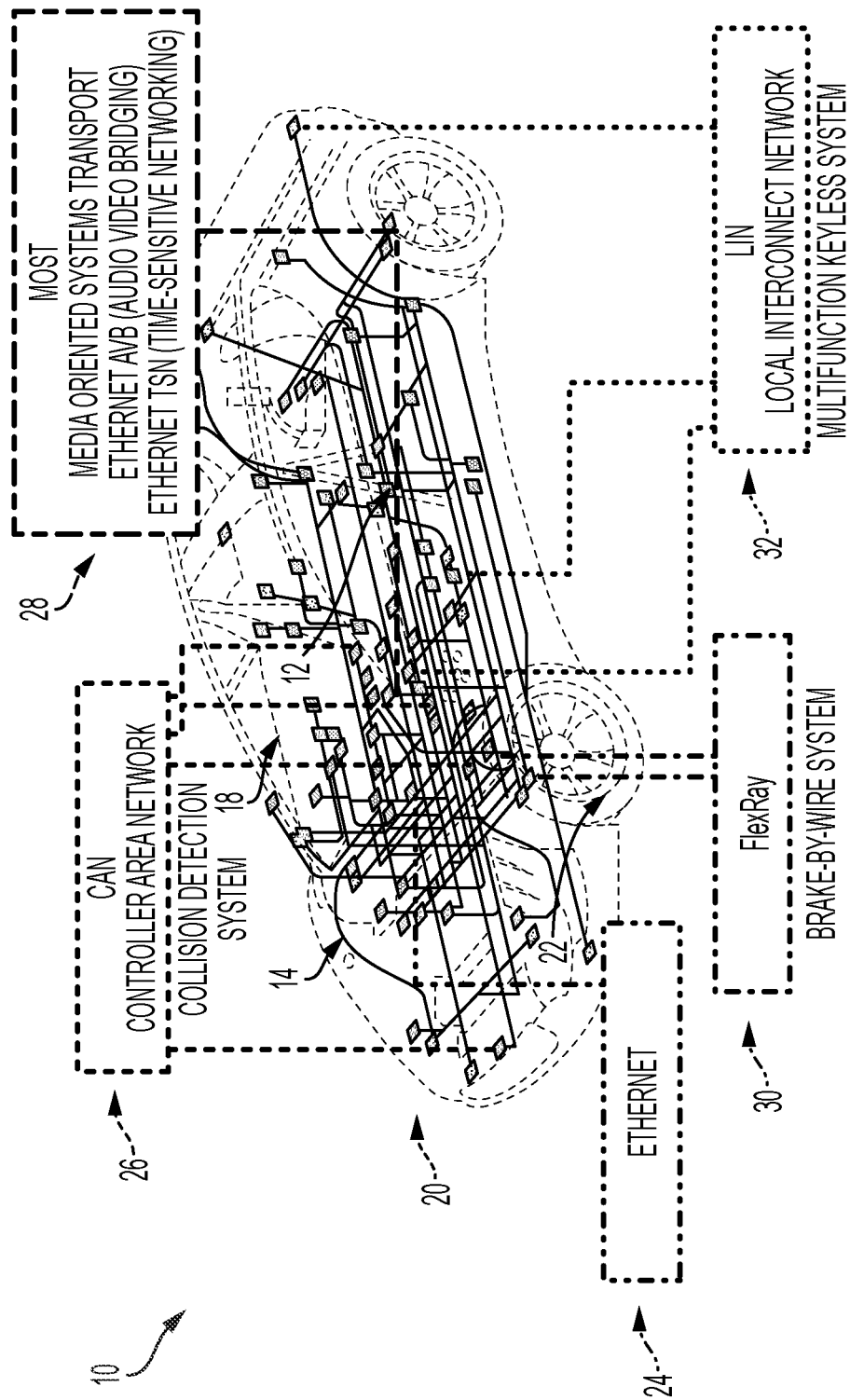
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, marine craft, aircraft, all-terrain vehicles, recreational vehicles, or other suitable vehicles, include a steering system, such as an electronic power steering (EPS) system, a steer-by-wire (SbW) steering system, a hydraulic steering system, or other suitable steering system. The steering system typically includes one or more controllers that control various aspects of the steering system including, but not limited to, controlling one or more electric motors and/or one or more actuators of the steering system. For example, in a SbW system, there are two actuators, a handwheel actuator and a roadwheel actuator.

Typically, for end stop learning and protection of a handwheel actuator and a roadwheel actuator, there is no actual mechanical end of travel for the handwheel actuator, and the main object of end stop is to provide some resistance torque to avoid over travel. Additionally, for the roadwheel actuator, the object of the end stop is to protect the mechanical system from impact failure. One challenge regarding end of travel learning for a handwheel actuator is that there is no physical end travel, which impacts the ability of the end of travel to be learned.

Accordingly, systems and methods, such as the systems and methods described herein, configured to determine a handwheel actuator end of travel based on a learned value of a roadwheel actuator, may be desirable. In some embodiments, the systems and methods described herein may be configured to learn a roadwheel actuator end of travel (e.g., signals, end of travel clockwise detect and end of travel counter clockwise detect, are true). The systems and methods described herein may be configured to determine a handwheel actuator end of travel values based on roadwheel actuator values. For example, a virtual handwheel position lookup table may be used to inversely lookup an actual handwheel position. Signals from a sensor of a roadwheel actuator (e.g., end of travel clockwise detect, end of travel counter clockwise detect, end of travel clockwise, and end of travel counterclockwise) may be transmitted to the handwheel actuator. In some embodiments, before the roadwheel actuator end of travel is learned, the systems and method described herein may be configured to use a calibratable default value may and/or may consider the conversion of a C-factor. The default value may be set to a larger value than the actual possible learned value to enable the learning of a roadwheel actuator.

In some embodiments, the systems and methods described herein may be configured to expand conventional roadwheel actuator end of travel protection logic to include an end of travel active command and end of travel damping command, which may be added to a roadwheel motor torque command. An end of travel motor torque limit may be applied to the roadwheel motor torque command. Additionally, or alternatively, an end of travel assist scale may be used to scale down the motor torque command before limiting.

In some embodiments, the systems and methods described herein may be configured to expand conventional handwheel end of travel protection logic to include end of travel active command and end of travel damping command, which may be the main outputs of the handwheel actuator software end stop and may be added to a reference torque. The general effort and damping level at an end of travel range may be decided thereby. In some embodiments, more vehicle speed points (e.g., 12 or other suitable number of vehicle speed points) and handwheel velocity points (e.g., 20 or other suitable number of handwheel velocity points) may be added to give more tuning space for different end of travel feel at different vehicle speeds and handwheel velocities. As used herein, a vehicle speed point refers to a measurement or sensed value of a speed of a vehicle, and a handwheel velocity point refers to a measurement or sensed value of a speed of rotation of a handwheel. Additionally, or alternatively, end of travel learning logic may be independent of software end stop logic.

In some embodiments, the systems and methods described herein may be configured to receive sensor data from at least one sensor associated with a roadwheel actuator of a vehicle. The systems and methods described herein may be configured to determine, based on the sensor data, a mechanical end-of-travel value of a roadwheel actuator of the vehicle. The systems and methods described herein may be configured to determine, based on the mechanical end-of-travel value of the roadwheel actuator and a speed of the vehicle, a handwheel actuator end-of-travel active value and an end-of-travel damping value. The systems and methods described herein may be configured to determine an end-of-travel value of a handwheel actuator based on the handwheel actuator end-of-travel active value, the end-of-travel damping value, and a reference torque value. The systems and methods described herein may be configured to selectively control the handwheel of the vehicle based on the end-of-travel value of the handwheel actuator.

In some embodiments, the systems and methods described herein may be configured to determine, based on the mechanical end-of-travel value of the roadwheel actuator and the speed of the vehicle, the handwheel actuator end-of-travel active value by using a lookup table.

In some embodiments, the systems and methods described herein may be configured to determine the end-of-travel damping value by multiplying a damping ratio by a velocity of the vehicle.

In some embodiments, the systems and methods described herein may be configured to determine the end-of-travel value of the handwheel actuator by adding the handwheel actuator end-of-travel active value and the end-of-travel damping value to the reference torque value.

In some embodiments, the systems and methods described herein may be configured to determine, responsive to an error in the sensor data, the handwheel actuator end-of-travel active value and the end-of-travel damping value based on a default end-of-travel value of the roadwheel actuator. In some embodiments, the error in the sensor data may correspond to one of a fault in the at least one sensor and a lack of sensor data. In some embodiments, the default end-of-travel value of the roadwheel actuator may be larger than the mechanical end-of-travel value of the roadwheel actuator of the roadwheel actuator.

In some embodiments, the systems and methods described herein may be configured to determine an end-of-travel protection value based on the handwheel actuator end-of-travel active value, the end-of-travel damping value, an end-of-travel assist scale, a roadwheel motor torque command, or a combination thereof. In some embodiments, the end-of-travel assist scale may include a scale factor that limits at least one vehicle command from opposing the handwheel actuator end-of-travel active value.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated rack force, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
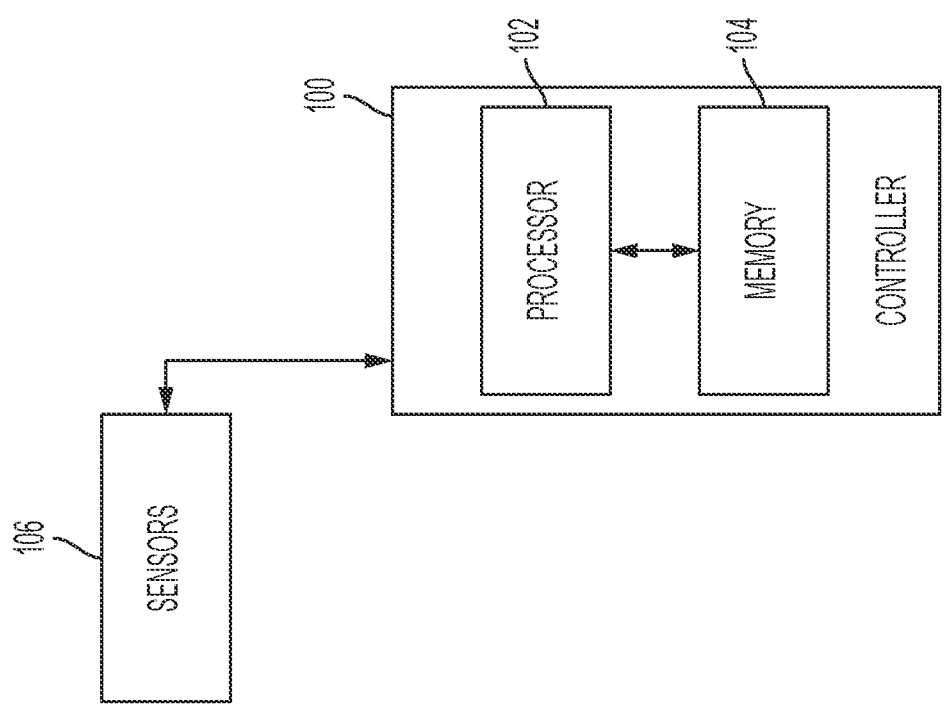
FIG. 2 generally illustrates an over learn protection system according to the principles of the present disclosure.

In some embodiments, the steering system may include a steering system controller, such as controller 100, as is generally illustrated in FIG. 2. The controller 100 may include any suitable controller. The controller 100 may be configured to control, for example, the various functions of the steering system. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various functions of the steering system.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angel, a motor velocity, a vehicle speed, other suitable information, or a combination thereof.

In some embodiments, the controller 100 may be configured to receive sensor data from at least one sensor associated with a roadwheel actuator of a vehicle. The controller 100 may determine, based on the sensor data, a mechanical end-of-travel value of a roadwheel actuator of the vehicle. The controller 100 may determine, based on the mechanical end-of-travel value of the roadwheel actuator and a speed of the vehicle, a handwheel actuator end-of-travel active value and an end-of-travel damping value. The controller 100 may determine an end-of-travel value of a handwheel actuator based on the handwheel actuator end-of-travel active value, the end-of-travel damping value, and a reference torque value. The controller 100 may selectively control the handwheel of the vehicle based on the end-of-travel value of the handwheel actuator.

In some embodiments, the controller 100 may determine, based on the mechanical end-of-travel value of the roadwheel actuator and the speed of the vehicle, the handwheel actuator end-of-travel active value by using a lookup table.

In some embodiments, the controller 100 may determine the end-of-travel damping value by multiplying a damping ratio by a velocity of the vehicle.

In some embodiments, the controller 100 may determine the end-of-travel value of the handwheel actuator by adding the handwheel actuator end-of-travel active value and the end-of-travel damping value to the reference torque value.

In some embodiments, the controller 100 may determine, responsive to an error in the sensor data, the handwheel actuator end-of-travel active value and the end-of-travel damping value based on a default end-of-travel value of the roadwheel actuator. The error in the sensor data may correspond to one of a fault in the at least one sensor and a lack of sensor data. The default end-of-travel value of the roadwheel may be larger than the mechanical end-of-travel value of the roadwheel actuator.

In some embodiments, the controller 100 may determine an end-of-travel protection value based on the handwheel actuator end-of-travel active value, the end-of-travel damping value, an end-of-travel assist scale, a roadwheel motor torque command, or a combination thereof. The end-of-travel assist scale may include a scale factor that limits at least one vehicle command from opposing the handwheel actuator end-of-travel active value.

Figure 3:
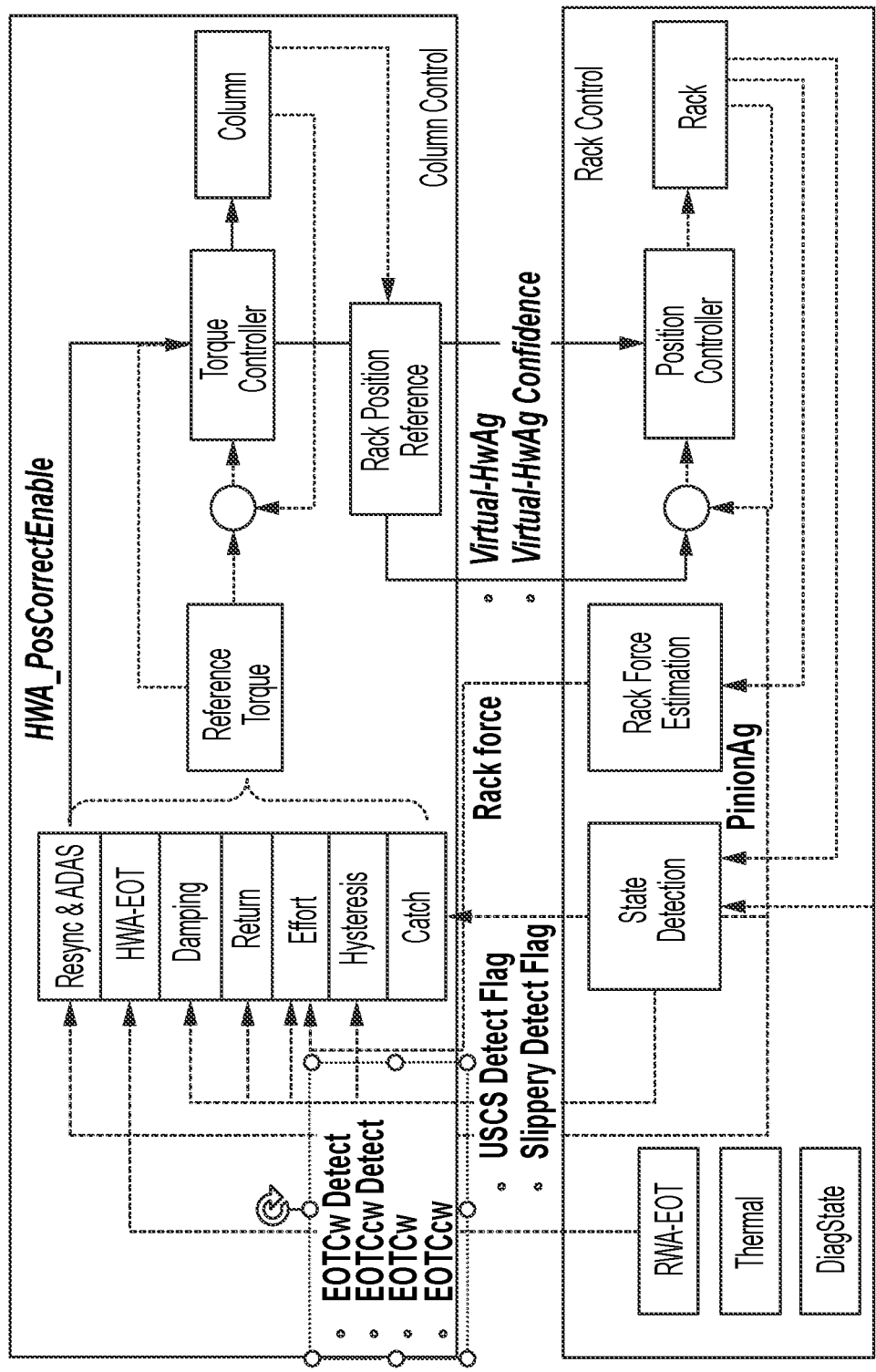
FIG. 3 generally illustrates a handwheel control system and a roadwheel control system according to the principles of the present disclosure.

FIG. 3 generally illustrates a handwheel control system and a roadwheel control system. As described, controller 100 may determine a handwheel actuator end of travel based on a learned value of a roadwheel actuator. The controller 100 may receive one or more signals (e.g., such as an end of travel clockwise detect signal, an end of travel counter clockwise detect signal, an end of travel clockwise signal, an end of travel counterclockwise signal, and/or other suitable signal or signals) from a sensor of a roadwheel actuator (e.g., RWA-EOT in FIG. 3). The controller 100 may control the handwheel actuator (e.g., HWA-EOT in FIG. 3) based on the one or more signals.

Figure 4:
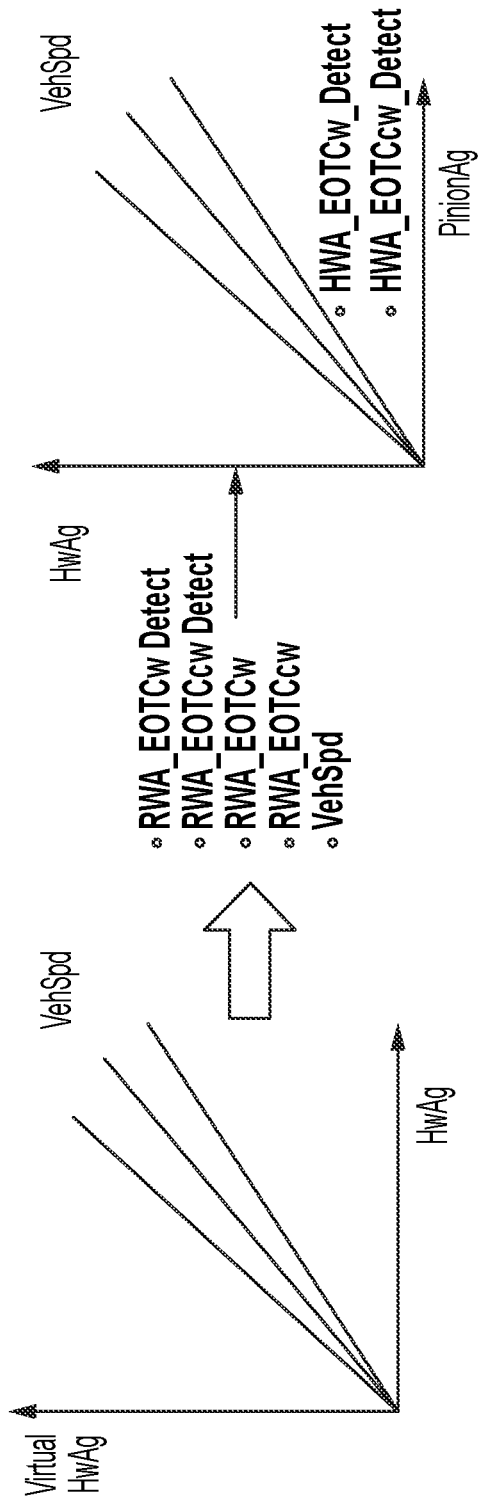
FIG. 4 generally illustrates a handwheel position lookup table according to the principles of the present disclosure.

In some embodiments, when the controller 100 learns the roadwheel actuator end of travel values (e.g., based on the one or more signals indicating that an end of travel clockwise detect and end of travel counter clockwise detect signals, are true), the controller 100 may determine the handwheel actuator end of travel values based on roadwheel actuator end of travel values. For example, as is generally illustrated in FIG. 4, the controller 100 may use a virtual handwheel position lookup table to inversely lookup an actual handwheel position. The lookup table may include a number of handwheel actuator end of travel values that correspond to a roadwheel actuator end of travel value. Additionally, or alternatively, the lookup table may include or indicate a steering ratio between handwheel actuator and a roadwheel actuator. The steering ratio may change based on the vehicle speed.

Figure 5A:
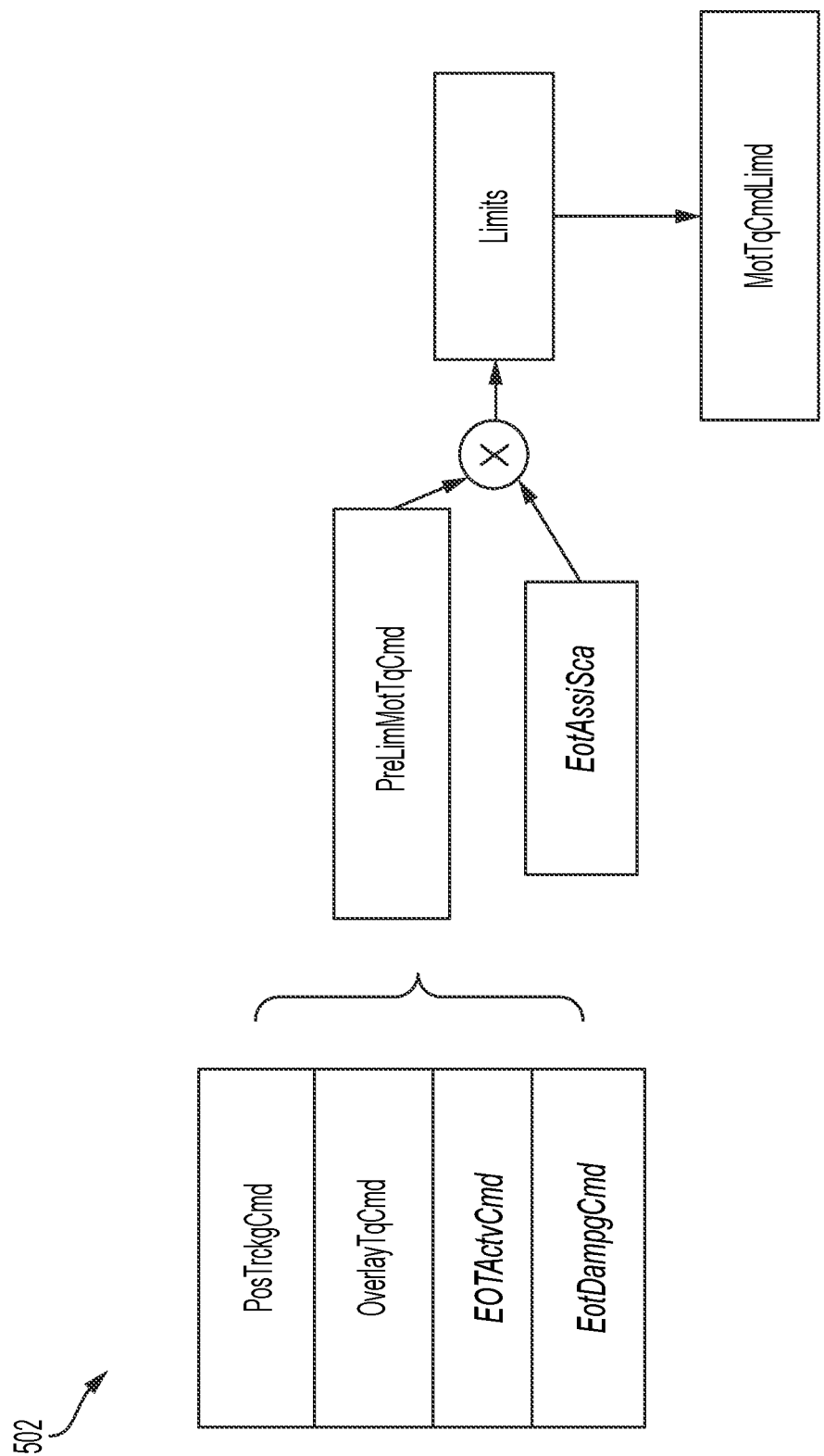
FIGS. 5A and 5B generally illustrate changes to end of travel protection logic according to the principles of the present disclosure.

As is generally illustrated at 502 of FIG. 5A, the controller 100 may expand conventional roadwheel actuator end of travel protection logic to include an end of travel active command (e.g., EOTActvCmd in FIG. 5A) and an end of travel damping command (e.g., EOTDampgCmd in FIG. 5A), which the controller 100 may add to a roadwheel motor torque command. The controller 100 may apply an end of travel motor torque limit to the roadwheel motor torque command. Additionally, or alternatively, the controller 100 may use an end of travel assist scale (e.g., EOTAssiSca in FIG. 5A) to scale down the motor torque command before limiting.

In some embodiments, the roadwheel actuator end of travel active command may include a lookup table, where the x-axis is a pinion position and the y-axis is the roadwheel actuator end of travel active command. As the pinion position moves toward the end of travel the roadwheel actuator end of travel active command increases. Additionally, or alternatively, the end of travel damping command may include a damping ratio. For example, within the working range of the end of travel, damping may be enabled. The final end of travel damping command may equal the damping ratio multiplied by the handwheel velocity. The end of travel assist scale may include or correspond to a lookup table, where the x-axis is a scale factor from one to zero and the y-axis is a pinion position. The controller 100 may scale down, using the end of travel assist scale, (e.g., from 100% to 0%) other commands that may work against the end of travel active command.

Figure 5B:
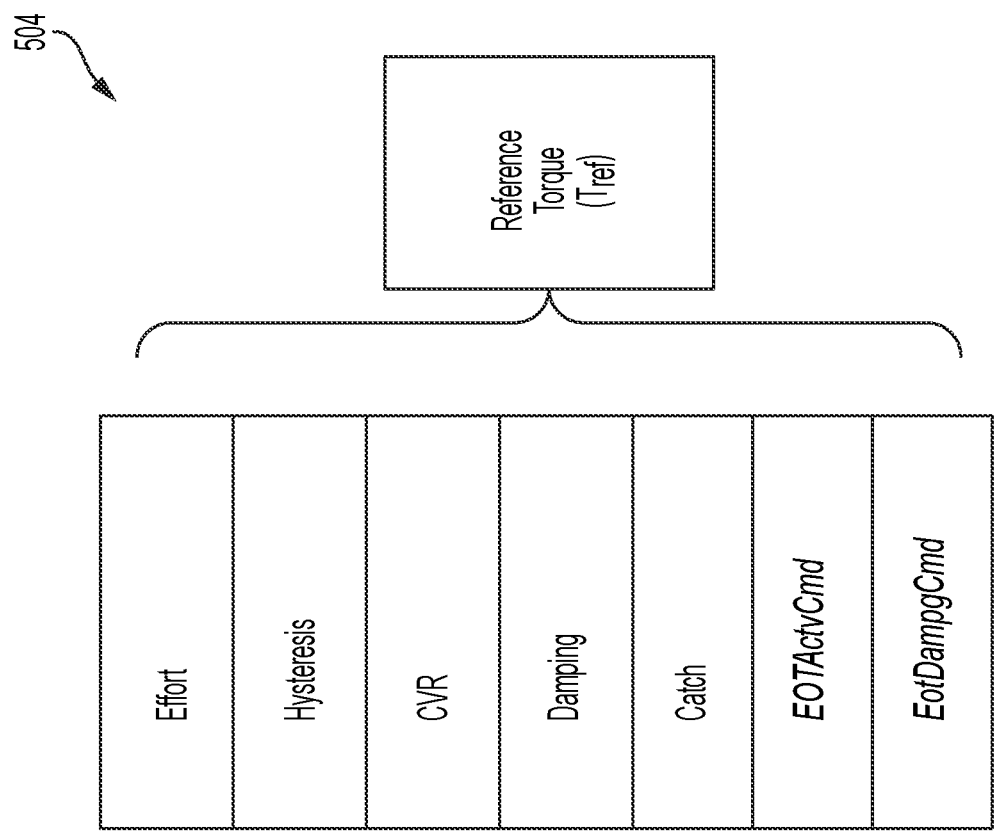

As is generally illustrated at 504 of FIG. 5B, the controller 100 may expand conventional handwheel end of travel protection logic to include end of travel active command (e.g., EOTActvCmd in FIG. 5B) and end of travel damping command (e.g., EOTDampCmd in FIG. 5B), which may be the main outputs of the handwheel actuator software end stop and may be added to a reference torque. The controller 100 may determine the general effort and damping level at an end of travel range using the end of travel active command and/or the end of travel damping command. The controller 100 may add more vehicle speed points (e.g., 12 or other suitable number vehicle speed points) and/or handwheel velocity points (e.g., 20 or other suitable number of handwheel velocity points) to provide more tuning space for different end of travel feel at different vehicle speeds and handwheel velocities. Additionally, or alternatively, end of travel learning logic may be independent of software end stop logic.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 6:
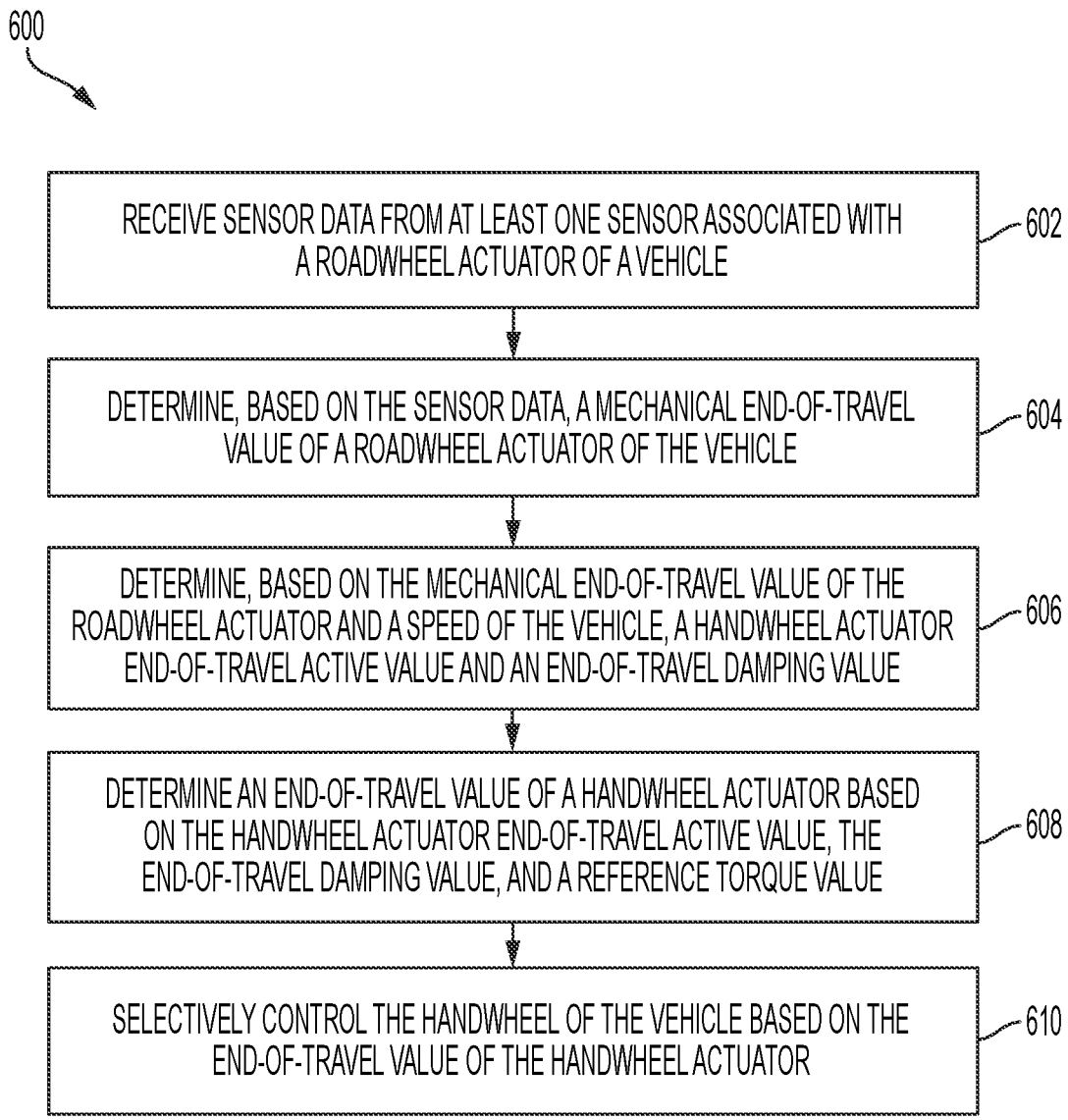
FIG. 6 is a flow diagram generally illustrating a method for controlling an end-of-travel of a handwheel according to the principles of the present disclosure.

FIG. 6 is a flow diagram generally illustrating method 600 for controlling an end-of-travel of a handwheel according to the principles of the present disclosure. At 602, the method 400 receives sensor data from at least one sensor associated with a roadwheel actuator of a vehicle.

At 604, the method 600 determines, based on the sensor data, a mechanical end-of-travel value of a roadwheel actuator of the vehicle. For example, the controller 100 may determine, based on the sensor data, the mechanical end-of-travel value for the roadwheel actuator of the vehicle 10.

At 606, the method 600 determines, based on the mechanical end-of-travel value of the roadwheel actuator and a speed of the vehicle, a handwheel actuator end-of-travel active value and an end-of-travel damping value. For example, the controller 100 may determine, based on the mechanical end-of-travel value of the roadwheel actuator and the speed of the vehicle 10, the handwheel actuator end-of-travel active value and the end-of-travel damping value.

At 608, the method 600 determines an end-of-travel value of a handwheel actuator based on the handwheel actuator end-of-travel active value, the end-of-travel damping value, and a reference torque value. Fr example, the controller 100 may determine the end-of-travel value of the handwheel actuator based on the handwheel actuator end-of-travel active value, the end-of-travel damping value, and a reference torque value.

At 610, the method 600 selectively controls the handwheel of the vehicle based on the end-of-travel value of the handwheel actuator. For example, the controller 100 may selectively control the handwheel of the vehicle based on the end-of-travel value of the handwheel actuator.

In some embodiments, a system for controlling an end-of-travel of a handwheel comprises a processor and a memory. The memory includes instructions that, when executed by the processor, cause the processor to: receive sensor data from at least one sensor associated with a roadwheel actuator of a vehicle; determine, based on the sensor data, a mechanical end-of-travel value of a roadwheel actuator of the vehicle; determine, based on the mechanical end-of-travel value of the roadwheel actuator and a speed of the vehicle, a handwheel actuator end-of-travel active value and an end-of-travel damping value; determine an end-of-travel value of a handwheel actuator based on the handwheel actuator end-of-travel active value, the end-of-travel damping value, and a reference torque value; and selectively control the handwheel of the vehicle based on the end-of-travel value of the handwheel actuator.

In some embodiments, the memory further includes instructions that, when executed by the processor, cause the processor to determine, based on the mechanical end-of-travel value of the roadwheel actuator and the speed of the vehicle, the handwheel actuator end-of-travel active value by using a lookup table.

In some embodiments, the memory further includes instructions that, when executed by the processor, cause the processor to: determine the end-of-travel damping value by multiplying a damping ratio by a velocity of the vehicle.

In some embodiments, the memory further includes instructions that, when executed by the processor, cause the processor to: determine the end-of-travel value of the handwheel actuator by adding the handwheel actuator end-of-travel active value and the end-of-travel damping value to the reference torque value.

In some embodiments, the memory further includes instructions that, when executed by the processor, cause the processor to: determine, responsive to an error in the sensor data, the handwheel actuator end-of-travel active value and the end-of-travel damping value based on a default end-of-travel value of the roadwheel actuator.

In some embodiments, the error in the sensor data corresponds to one of a fault in the at least one sensor and a lack of sensor data.

In some embodiments, the default end-of-travel value of the roadwheel actuator is larger than the mechanical end-of-travel value of the roadwheel actuator.

In some embodiments, the memory further includes instructions that, when executed by the processor, cause the processor to: determine an end-of-travel protection value based on the handwheel actuator end-of-travel active value, the end-of-travel damping value, an end-of-travel assist scale, and a roadwheel motor torque command.

In some embodiments, the end-of-travel assist scale is a scale factor that limits at least one vehicle command from opposing the handwheel actuator end-of-travel active value.

In some embodiments, a method for controlling an end-of-travel of a handwheel comprises: receiving sensor data from at least one sensor associated with a roadwheel actuator of a vehicle; determining, based on the sensor data, a mechanical end-of-travel value of a roadwheel actuator of the vehicle; determining, based on the mechanical end-of-travel value of the roadwheel actuator and a speed of the vehicle, a handwheel actuator end-of-travel active value and an end-of-travel damping value; determining an end-of-travel value of a handwheel actuator based on the handwheel actuator end-of-travel active value, the end-of-travel damping value, and a reference torque value; and selectively controlling the handwheel of the vehicle based on the end-of-travel value of the handwheel actuator.

In some embodiments, the method further comprises: determining, based on the mechanical end-of-travel value of the roadwheel actuator and the speed of the vehicle, the handwheel actuator end-of-travel active value by using a lookup table.

In some embodiments, the method further comprises: determining the end-of-travel damping value by multiplying a damping ratio by a velocity of the vehicle.

In some embodiments, the method further comprises: determining the end-of-travel value of the handwheel actuator by adding the handwheel actuator end-of-travel active value and the end-of-travel damping value to the reference torque value.

In some embodiments, the method further comprises: determining, responsive to an error in the sensor data, the handwheel actuator end-of-travel active value and the end-of-travel damping value based on a default end-of-travel value of the roadwheel actuator.

In some embodiments, the error in the sensor data corresponds to one of a fault in the at least one sensor and a lack of sensor data.

In some embodiments, the default end-of-travel value of the roadwheel actuator is larger than the mechanical end-of-travel value of the roadwheel actuator.

In some embodiments, the method further comprises determining an end-of-travel protection value based on the handwheel actuator end-of-travel active value, the end-of-travel damping value, an end-of-travel assist scale, and a roadwheel motor torque command.

In some embodiments, the end-of-travel assist scale is a scale factor that limits at least one vehicle command from opposing the handwheel actuator end-of-travel active value.

In some embodiments, a system for controlling an end-of-travel of a handwheel comprises: the handwheel; at least one sensor associated with the roadwheel actuator of a vehicle; a processor; and a memory. The memory includes instructions that, when executed by the processor, cause the processor to: receive sensor data from the at least one sensor associated with the roadwheel actuator of a vehicle; determine, based on the sensor data, a mechanical end-of-travel value of a roadwheel actuator of the vehicle; determine, based on the mechanical end-of-travel value of the roadwheel actuator and a speed of the vehicle, a handwheel actuator end-of-travel active value and an end-of-travel damping value; determine an end-of-travel value of a handwheel actuator based on the handwheel actuator end-of-travel active value, the end-of-travel damping value, and a reference torque value; and selectively control the handwheel of the vehicle based on the end-of-travel value of the handwheel actuator.

In some embodiments, the memory further includes instructions that, when executed by the processor, cause the processor to: determine, based on the mechanical end-of-travel value of the roadwheel actuator and the speed of the vehicle, the handwheel actuator end-of-travel active value by using a lookup table.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A system for controlling an end-of-travel of a handwheel, the system comprising:
   a processor; and
   a memory that includes instructions that, when executed by the processor, cause the processor to:
      receive sensor data from at least one sensor associated with a roadwheel actuator of a vehicle;
      determine, based on the sensor data, a mechanical end-of-travel value of the roadwheel actuator of the vehicle;
      determine, based on the mechanical end-of-travel value of the roadwheel actuator and a speed of the vehicle, a handwheel actuator end-of-travel active value and a handwheel actuator end-of-travel damping value, wherein, responsive to an error in the sensor data, the handwheel actuator end-of-travel active value and the handwheel actuator end-of-travel damping value are determined based on a default end-of-travel value of the roadwheel actuator, wherein the error in the sensor data corresponds to a fault in the at least one sensor, and wherein the default end-of-travel value of the roadwheel actuator is larger than the mechanical end-of-travel value of the roadwheel actuator;
      determine an end-of-travel value of a handwheel actuator based on the handwheel actuator end-of-travel active value, the handwheel actuator end-of-travel damping value, and a reference torque value; and
      selectively control the handwheel of the vehicle based on the end-of-travel value of the handwheel actuator.

2. The system of claim 1, wherein the instructions further cause the processor to:
   determine, based on the roadwheel actuator and the speed of the vehicle, the handwheel actuator end-of-travel active value by using a lookup table.

3. The system of claim 1, wherein the memory further includes instructions that, when executed by the processor, cause the processor to:
   determine the handwheel actuator end-of-travel damping value by multiplying a damping ratio by a velocity of the vehicle.

4. The system of claim 1, wherein the instructions further cause the processor to:
   determine the end-of-travel active value of the handwheel actuator by adding the handwheel actuator end-oftravel active value and the handwheel actuator end-of-travel damping value to the reference torque value.

5. The system of claim 1, wherein the instructions further cause the processor to:
determine a roadwheel actuator end-of-travel protection value based on the handwheel actuator end-of-travel active value, the handwheel actuator end-of-travel damping value, an end-of-travel assist scale, and a roadwheel motor torque command.

6. The system of claim 5, wherein the end-of-travel assist scale is a scale factor that limits at least one vehicle command from opposing the handwheel actuator end-of-travel active value.

7. A method for controlling an end-of-travel of a handwheel, the method comprising:
receiving sensor data from at least one sensor associated with a roadwheel actuator of a vehicle;
determining, based on the sensor data, a mechanical end-of-travel value of the roadwheel actuator of the vehicle;
determining, based on the mechanical end-of-travel value of the roadwheel actuator and a speed of the vehicle, a handwheel actuator end-of-travel active value and a handwheel actuator end-of-travel damping value, wherein, responsive to an error in the sensor data, the handwheel actuator end-of-travel active value and the handwheel actuator end-of-travel damping value are determined based on a default end-of-travel value of the roadwheel actuator, wherein the error in the sensor data corresponds to a fault in the at least one sensor, and wherein the default end-of-travel value of the roadwheel actuator is larger than the mechanical end-of-travel value of the roadwheel actuator;
determining an end-of-travel value of a handwheel actuator based on the handwheel actuator end-of-travel active value, the handwheel actuator end-of-travel damping value, and a reference torque value; and
selectively controlling the handwheel of the vehicle based on the end-of-travel value of the handwheel actuator.

8. The method of claim 7, further comprising:
determining, based on the mechanical end-of-travel value of the roadwheel actuator and the speed of the vehicle, the handwheel actuator end-of-travel active value by using a lookup table.

9. The method of claim 7, further comprising:
determining the handwheel actuator end-of-travel damping value by multiplying a damping ratio by a velocity of the vehicle.

10. The method of claim 7, further comprising:
determining the end-of-travel active value of the handwheel actuator by adding the handwheel actuator end-of-travel active value and the handwheel actuator end-of-travel damping value to the reference torque value.

11. The method of claim 7, further comprising:
determining a roadwheel actuator end-of-travel protection value based on the handwheel actuator end-of-travel active value, the handwheel actuator end-of-travel damping value, an end-of-travel assist scale, and a roadwheel motor torque command.

12. The method of claim 11, wherein the end-of-travel assist scale is a scale factor that limits at least one vehicle command from opposing the handwheel actuator end-of-travel active value.

13. A system for controlling an end-of-travel of a handwheel, the system comprising:
the handwheel;
at least one sensor associated with a roadwheel actuator of a vehicle;
a processor; and
a memory that includes instructions that, when executed by the processor, cause the processor to:
receive sensor data from at least one sensor associated with a roadwheel actuator of a vehicle;
determine, based on the sensor data, a mechanical end-of-travel value of the roadwheel actuator of the vehicle;
determine, based on the mechanical end-of-travel value of the roadwheel actuator and a speed of the vehicle, a handwheel actuator end-of-travel active value and a handwheel actuator end-of-travel damping value, wherein, responsive to an error in the sensor data, the handwheel actuator end-of-travel active value and the handwheel actuator end-of-travel damping value are determined based on a default end-of-travel value of the roadwheel actuator, wherein the error in the sensor data corresponds to a fault in the at least one sensor, and wherein the default end-of-travel value of the roadwheel actuator is larger than the mechanical end-of-travel value of the roadwheel actuator;
determine an end-of-travel value of a handwheel actuator based on the handwheel actuator end-of-travel active value, the handwheel actuator end-of-travel damping value, and a reference torque value; and
selectively control the handwheel of the vehicle based on the end-of-travel value of the handwheel actuator.

14. The system of claim 13, wherein the instructions further cause the processor to:
determine, based on the mechanical end-of-travel value of the roadwheel actuator and the speed of the vehicle, the handwheel actuator end-of-travel active value by using a lookup table.

* * * * *